(12) United States Patent
Zheng et al.

(10) Patent No.: US 10,794,167 B2
(45) Date of Patent: Oct. 6, 2020

(54) METHOD AND SYSTEM FOR REMOVING CONTAMINANTS FROM A GAS STREAM USING A LIQUID ABSORBENT

(71) Applicant: SCHLUMBERGER TECHNOLOGY CORPORATION, Sugar Land, TX (US)

(72) Inventors: Z. Frank Zheng, Cypress, TX (US); Dahai Tang, Sugar Land, TX (US); Sandrine Hoebler, Sugar Land, TX (US); Matthew J. Hull, Cypress, TX (US); Gary W. Sams, Spring, TX (US); Ankur D. Jariwala, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/209,401

(22) Filed: Dec. 4, 2018

(65) Prior Publication Data

US 2020/0173266 A1 Jun. 4, 2020

(51) Int. Cl.
*B01D 53/14* (2006.01)
*E21B 43/34* (2006.01)

(52) U.S. Cl.
CPC .......... *E21B 43/34* (2013.01); *B01D 53/1412* (2013.01); *B01D 53/1468* (2013.01); *B01D 53/1493* (2013.01); *B01D 2252/20436* (2013.01); *B01D 2256/245* (2013.01); *B01D 2257/304* (2013.01); *B01D 2259/10* (2013.01)

(58) Field of Classification Search
None
See application file for complete search history.

(56) References Cited

U.S. PATENT DOCUMENTS

| | | |
|---|---|---|
| 4,836,991 A | 6/1989 | Ishiguro et al. |
| 8,899,557 B2 | 12/2014 | Cullinane et al. |
| 9,102,886 B1 | 8/2015 | Schmidt |
| 2002/0150516 A1 | 10/2002 | Pahlman et al. |
| 2003/0005823 A1 | 1/2003 | Le Blanc et al. |
| 2005/0188841 A1 | 9/2005 | Khan |
| 2011/0168019 A1 | 7/2011 | Northrop et al. |

(Continued)

FOREIGN PATENT DOCUMENTS

| | | |
|---|---|---|
| EP | 0437338 A1 | 7/1991 |
| WO | 2012067101 A1 | 5/2012 |

OTHER PUBLICATIONS

Search Report and Written Opinion of International Patent Application No. PCT/US2019/064229 dated Mar. 31, 2020, 10 pages.

(Continued)

*Primary Examiner* — Daniel Berns
(74) *Attorney, Agent, or Firm* — Hauptman Ham, LLP; Ronald J. Embry, Jr.

(57) ABSTRACT

Embodiments described herein provide methods of operating a linear contactor for absorbing contaminants from a gas stream. The gas stream flows from a first end to a second end of the linear contactor. Fresh absorbent is provided at the first end of the linear contactor based on the theoretical minimum amount of absorbent needed to remove the contaminants. Absorbent is recycled from the second end to the first end of the linear contactor. Fresh absorbent is provided at the second end based on chemical condition of the recycled absorbent. Apparatus for practicing the method is also described.

17 Claims, 3 Drawing Sheets

(56) References Cited

U.S. PATENT DOCUMENTS

| | | |
|---|---|---|
| 2011/0203456 A1 | 8/2011 | Hakansson |
| 2011/0217218 A1 | 9/2011 | Gupta et al. |
| 2012/0238793 A1 | 9/2012 | Cullinane et al. |
| 2013/0000486 A1 | 1/2013 | Guenther |
| 2013/0343978 A1 | 12/2013 | Ballaguet et al. |
| 2015/0375169 A1 | 12/2015 | Youssef et al. |

OTHER PUBLICATIONS

Search Report and Written Opinion of International Patent Application No. PCT/US2019/064743 dated Mar. 27, 2020, 12 pages.

Fig. 2

```
                                          ┌─ 300
PROVIDE A GAS STREAM CONTAINING CONTAMINANTS  ─ 302
TO A MIXING ZONE OF A LINEAR CONTACTOR

PROVIDE A RECYCLE ABSORBENT STREAM TO THE     ─ 304
MIXING ZONE OF THE LINEAR CONTACTOR

FORM AN AEROSOL OF THE RECYCLE               ─ 306
ABSORBENT IN THE GAS STREAM

FLOW THE AEROSOL THROUGH THE LINEAR          ─ 308
CONTACTOR FROM THE MIXING ZONE TO A
SEPARATION ZONE OF THE LINEAR CONTACTOR

PROVIDE A FRESH ABSORBENT TO THE SEPARATION ZONE  ─ 310

RECOVER A CLEAN GAS AND A RECOVERED ABSORBENT ─ 312
IN THE SEPARATION ZONE, AND OBTAIN A RECYCLE
ABSORBENT FROM THE RECOVERED ABSORBENT

DETECT CHEMICAL CONDITION OF THE             ─ 314
RECYCLE ABSORBENT STREAM

REMOVE A SPENT ABSORBENT FROM                ─ 316
THE RECYCLE ABSORBENT
```

*Fig. 3*

METHOD AND SYSTEM FOR REMOVING CONTAMINANTS FROM A GAS STREAM USING A LIQUID ABSORBENT

FIELD

This application generally relates to processing of gas from hydrocarbon reservoirs. Specifically, this application describes methods and apparatus for removing contaminants from wellhead gases.

BACKGROUND

Hydrogen sulfide is a corrosive gas commonly present in hydrocarbon gases extracted from reservoirs. To process the gas into, for example, usable natural gas, the $H_2S$ is usually removed to reduce chemical attack on facilities. Two general methods currently exist for removing $H_2S$ from wellhead gases. In the first general method, the wellhead gas containing $H_2S$ is bubbled through a liquid that removes the $H_2S$ from the gas. The most popular liquid for scavenging $H_2S$ is a hexahydrotriazine (also known as a triazinane), which has the general formula

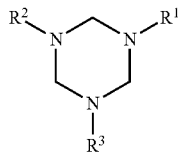

where $R^1$, $R^2$, and $R^3$ are usually hydrogen or small alkyl, alkoxy, or hydroxyalkyl substituents, and may be the same or different. The version where $R^1$, $R^2$, and $R^3$ is methyl, also known as "MMA triazine" from its monomethylamine precursor, is commonly used. The contacting is typically done in a vessel with a substantially vertical axis or orientation, such as a tower or drum.

In one configuration, the liquid is introduced at or near the top of the vessel while the gas is introduced at or near the bottom of the vessel. The gas bubbles upward through the liquid, which removes $H_2S$ from the gas through contact, and the de-acidified gas is recovered at or near the top of the vessel. In this configuration, the liquid and gas flow in countercurrent paths. Treated gas may entrain some liquid, which can be separated by simple settling or more complicated means.

In another configuration, gas is injected near the bottom of the vessel, but some scavenger liquid is misted into the gas prior to injection into the vessel. In this configuration, gas and liquid flow in concurrent paths, and both are removed near the top of the vessel, either through separate lines or together. Treated gas can be separated from scavenger liquid in subsequent operations.

Another method of contacting a wellhead gas containing $H_2S$ utilizes a mist of the liquid scavenger to contact the gas in a flowing stream. The scavenger liquid is typically misted into the flowing gas stream and the mixture is flowed through a pipe, or other flow vessel, to provide contact residence time. The liquid and gas are then separated. Such processes are also commonly used to remove other contaminant gases such as $CO_2$ (using amine absorbents), $SO_2$ (using caustic absorbents), and Hg (using sulfide or thiol absorbents).

Both general methods require relatively large facilities and amounts of liquid scavenger. The bubble contactor uses liquid as the continuous phase. To maintain gas in the dispersed phase, gas superficial velocity must be low, leading to large contactor size. The large contactor is filled with liquid scavenger, some of which becomes overly exposed to acid and solidifies, generating solid waste that must be removed. Misters suffer from low absorption efficiency due to high flow rates and low mist loading needed to maintain droplet dispersion in the gas phase. There is a need in the art for improved apparatus and methods for liquid scavenging of contaminants from wellhead gases.

SUMMARY

Embodiments described herein provide a method, comprising providing a feed gas stream containing contaminants to a first end of a linear contactor having a second end opposite the first end; providing an absorbent aerosol to the first end of the linear contactor; flowing the feed gas stream and the absorbent aerosol to the second end of the linear contactor; separating the absorbent aerosol from the feed gas stream to form a recovered absorbent; recycling a portion of the recovered absorbent to the first end of the linear contactor as recycled absorbent; mixing the recycled absorbent with a first fresh absorbent to form the absorbent aerosol; providing a second fresh absorbent at the second end of the linear contactor; recovering a clean gas stream at the second end of the linear contactor; determining a contaminant composition of the feed gas stream and the clean gas stream; determining a theoretical minimum amount of absorbent needed to remove the contaminants from the feed gas stream based on stoichiometry of the absorption reaction; determining a chemical condition of the recycled absorbent; setting a flow rate of the first fresh absorbent based on the determined theoretical minimum amount of absorbent; and setting a flow rate of the second fresh absorbent based on the determined chemical condition.

Other embodiments described herein provide a method, comprising providing a feed gas stream containing contaminants to a first end of a first linear contactor having a second end thereof opposite the first end thereof; providing a first absorbent aerosol to the first end of the first linear contactor; flowing the feed gas stream and the first absorbent aerosol to the second end of the first linear contactor; separating the first absorbent aerosol from the feed gas stream to form a first recovered absorbent; recycling a portion of the first recovered absorbent to the first end of the first linear contactor as a first recycled absorbent; mixing the first recycled absorbent with a first fresh absorbent to form the first absorbent aerosol; providing a second fresh absorbent at the second end of the first linear contactor; recovering an intermediate gas stream at the second end of the first linear contactor; providing the intermediate gas stream to the first end of a second linear contactor having a second end thereof opposite the first end thereof; providing a second absorbent aerosol to the first end of the second linear contactor; flowing the intermediate gas stream and the second absorbent aerosol to the second end of the second linear contactor; separating the second absorbent aerosol from the intermediate gas stream to form a second recovered absorbent; recycling a portion of the second recovered absorbent to the first end of the second linear contactor as a second recycled absorbent; mixing the second recycled absorbent with a third fresh absorbent to form the second absorbent aerosol; providing a fourth fresh absorbent at the second end of the second linear contactor; recovering a clean gas stream at the second end of the second linear contactor; determining a contaminant composition of the feed gas stream and the clean gas stream; determining a theoretical minimum amount of absorbent needed to remove the contaminants from the feed gas stream based on stoichiometry of the absorption reaction; determining a chemical condition of the first and second recycled absorbents; setting a flow rate of the first fresh absorbent, the third fresh absorbent, or both based on the determined theoretical minimum amount of absorbent; setting a flow rate of the second fresh absorbent based on the determined chemical condition of the first recycled absorbent; and setting a flow rate of the fourth fresh absorbent based on the determined chemical condition of the second recycle absorbent.

Further embodiments described herein provide an absorption apparatus, comprising a linear contactor having a first end and a second end opposite the first end; a feed gas line coupled to a gas inlet at the first end; a first fresh absorbent inlet at the first end of the linear contactor; a second fresh absorbent inlet at the second end of the linear contactor; a recycle absorbent inlet at the first end of the linear contactor; a contacting section extending between the first end and the second end; a gas outlet at the second end; a recycle absorbent outlet at the second end; a recycle absorbent line coupled from the recycle absorbent outlet to the recycle absorbent inlet; a first gas composition sensor coupled to the feed gas line; a second gas composition sensor coupled to the gas outlet line; a chemical condition sensor coupled to the recycle absorbent line; and a controller operatively coupled to the first and second gas composition sensors and to the chemical condition sensor, and configured to receive a feed gas contaminant composition at the feed gas line from the first gas composition sensor; receive a clean gas contaminant composition at the gas outlet from the second gas composition sensor; receive a chemical condition at the recycle absorbent line from the chemical condition sensor; determine a theoretical minimum amount of absorbent needed to remove the contaminants based on the feed gas contaminant composition and the clean gas contaminant composition; set a flow rate of fresh absorbent at the first fresh absorbent inlet based on the theoretical minimum amount; and set a flow rate of fresh absorbent at the second fresh absorbent inlet based on the chemical condition.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 2 is a process diagram of an absorption apparatus according to another embodiment.

FIG. 3 is a flow diagram illustrating a method according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
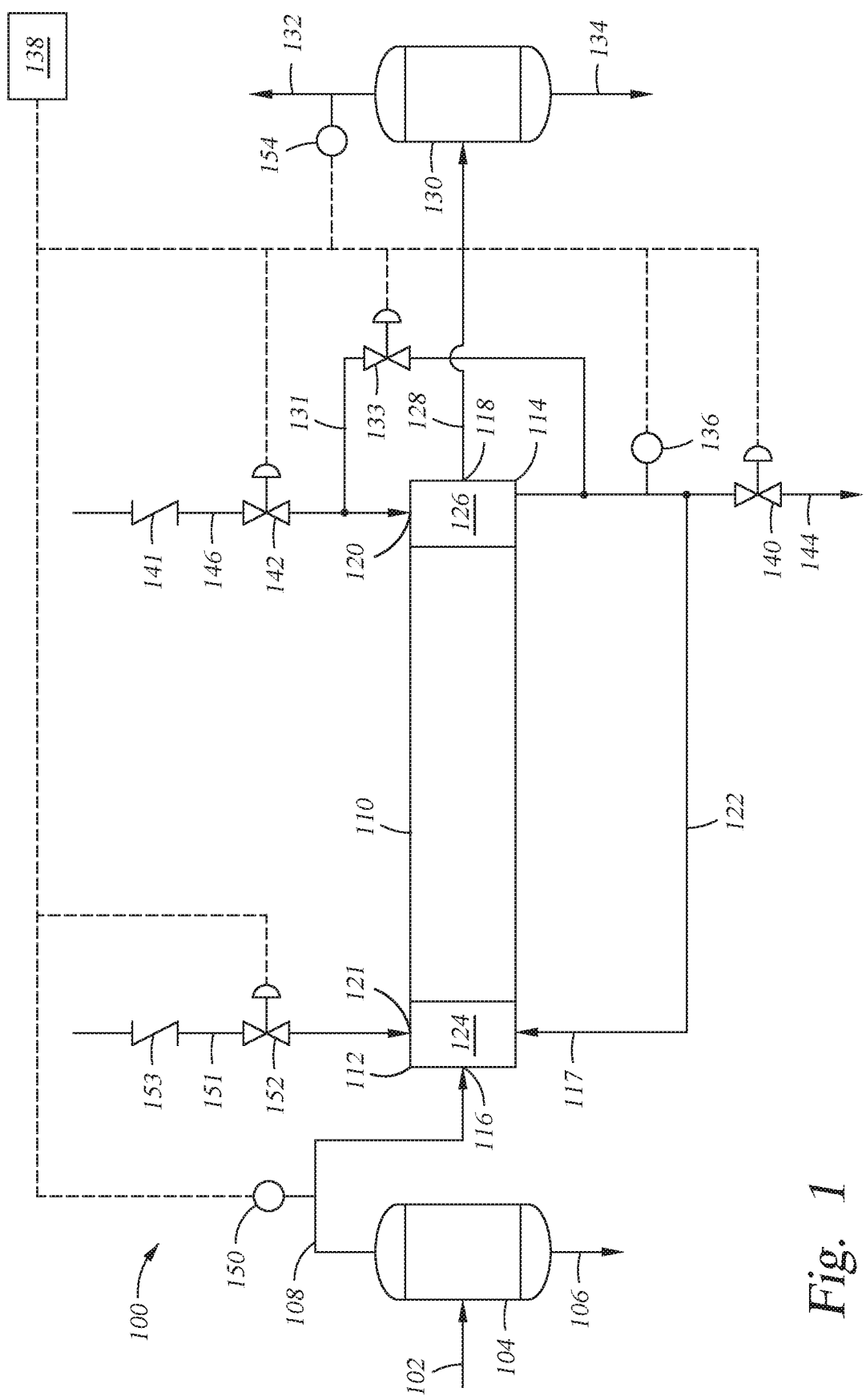
FIG. 1 is a process diagram of an absorption apparatus according to one embodiment.

FIG. 1 is a process diagram of an absorption apparatus 100 according to one embodiment. The absorption apparatus 100 contacts a liquid medium and a gas having contaminants to remove the contaminants through interaction between the gas and the liquid medium. A gas stream, which may be a wellhead gas stream, or another stream containing $H_2S$, or other contaminants that need to be removed from the gas stream, is optionally provided to a liquids removal stage 104 through a gas feed line 102. The liquids removal stage 104 removes liquids from the gas stream through settling, density separation, or other separation means. A liquid line 106 is coupled to the liquids removal stage 104 to remove separated liquids, and a dry gas line 108 also exits the liquids removal stage 104 carrying a dry gas stream. The liquids stream line 106 can be routed to remediation and/or disposal or to another destination for any desired use of the separated liquids.

The dry gas line 108 is coupled to a linear contactor 110 to carry the dry gas into the linear contactor 110. The dry gas is thus a feed gas for the linear contactor 110. The linear contactor 110 is a tubular structure that has a first end 112 and a second end 114 opposite the first end 112. The dry gas stream 108 flows into the linear contactor 110 at the first end 112, is treated in the linear contactor 110 while flowing to the second end 114, and exits at the second end 114. The linear contactor 110 thus has a gas inlet 116 at the first end 112 and a gas outlet 118 at the second end 114. The linear contactor 110 may be hollow, open, or empty inside, or in some cases turbulating features, such as vanes or baffles, may be included in the interior of the linear contactor 110.

An absorbent, such as a triazine for absorbing sulfur, is used to absorb contaminants from the dry gas. The absorbent is provided to the linear contactor 110 using aerosol generators. The aerosol generators may be misting nozzles, nebulizers, or other aerosol generators. Fresh absorbent is provided to the linear contactor 110 at two locations: a first fresh absorbent inlet 121 at the first end 112 and a second fresh absorbent inlet 120 at the second end 114. A first fresh absorbent line 151 is coupled to the first fresh absorbent inlet 121 via a first fresh absorbent control valve 152. A first check valve 153 may also be provided in the first fresh absorbent line 151 to prevent back-flow of contaminant-containing gas into the first fresh absorbent line 151. A second fresh absorbent line 146 is coupled to the second fresh absorbent inlet 120 via a second fresh absorbent control valve 142. A second check valve 141 may also be provided in the second fresh absorbent line 146 for the same reason as the first check valve 153.

An absorbent recycle line 122 is coupled to the linear contactor 110 near the second end 114 to remove absorbent from the linear contactor 110 at the second end 114. The absorbent recycle line 122 is also coupled to the linear contactor 110 near the first end 112 to return absorbent to the linear contactor 110 at the first end 112. The second fresh absorbent inlet 120 is located upstream of absorbent recycle line 122 such that the absorbent recycle includes fresh and used absorbent.

In the sulfur removal process, fresh triazine absorbent is high in pH, for example about 11 to 12, and as triazine absorbs sulfur by replacing nitrogen atoms with sulfur atoms, the triazine becomes a thiadiazine (one nitrogen replaced with sulfur), a dithiazine (two nitrogens replaced with sulfur), or a trithiane (all three nitrogens replaced with sulfur). The three sulfur-containing species exist in a distribution as the nitrogen-sulfur reactions proceed. For example, $H_2S$ can replace a nitrogen atom in a triazine molecule, a thiadiazine molecule, or a dithiazine molecule, as governed by the reaction kinetics of the system. It is believed that the reactions liberate amines that lower the pH of the system. Thus, as triazine absorbent is used, pH of the gas/absorbent system declines.

Low pH absorbent is known to be more effective at removing sulfur than high pH absorbent. It is believed that rate of protonation of a nitrogen atom in a triazine ring, which is the first step in replacement of the nitrogen atom with sulfur, is dependent on concentration of protons in the mixture, and therefore dependent on pH. Thus, use of recycled absorbent improves the effectiveness and efficiency of sulfur removal, enabling the process to remove sulfur at a lower absorbent use rate. Alternately, improved sulfur removal effectiveness can enable higher throughput at a given absorbent loading. Lower absorbent content in the gas improves stability of the mist dispersed in the gas, and prolongs the extensive surface contact between liquid and vapor phase available through use of the mist.

Other contaminant removal processes exhibit similar absorbent degradation as contaminants are removed. Contaminants increase in concentration over time and/or contaminant removal active sites are consumed. In all such cases, the used absorbent becomes less effective over time and must be replaced.

The linear contactor 110 includes a mixing section 124 at the first end 112 and a separation section 126 at the second end 114. The mixing section 124 provides a region in which an aerosol generator can be located to dispense absorbent in an aerosol form for mixing with the dry gas stream 108. A first fresh absorbent provided to the first fresh absorbent inlet 121 via the first fresh absorbent line 151 is mixed with recycled absorbent from the recycled absorbent line 122 at the mixing section 124, optionally using the aerosol generator. Small droplets of the absorbent are dispersed throughout the dry gas for maximizing contact surface of liquid and gas. The aerosol generator may be an atomizer or a nebulizer, any of which may be ultrasonic or piezoelectric. The separation section 126 provides a region in which the droplets of the mist can be allowed to coalesce into a liquid phase that separates from the gas phase, which is reduced in sulfur content by contact with the absorbent. The separation may be facilitated by rotation of the gas, or simply allowed to proceed under gravitational impetus. A clean gas stream 128 exits the second end 114 of the linear contactor 110 and is provided to a clean gas separator 130 where any remaining liquid is separated. A clean, dry gas stream 132 and a liquid stream 134 exit the clean gas separator 130. Any residual absorbent removed in the clean gas separator 130 can be routed to the recycle absorbent line 122 to recover the absorbent, if desired.

In the sulfur removal case, as the absorbent is contacted with the sulfur species in the gas, sulfur replaces nitrogen in the absorbent molecules, as described above. As the pH of the absorbent declines, conditions become favorable for the sulfur-containing absorbent molecules, the thiadiazines, dithiazines, and trithianes, to react together and polymerize. Molecules are formed that have limited, or no, solubility in the predominant liquid phase, and may crystallize, or otherwise solidify, potentially fouling portions of the liquid contactor 110 and reducing flow therethrough. As noted above, other absorbents are similarly reduced in effectiveness, and may develop unwanted characteristics, as contaminants are absorbed.

To manage the chemical condition of the used absorbent, a detector 136 is coupled to the absorbent recycle line 122, or to the liquid phase of the separation section 126, to monitor the chemical condition of the fluid. The detector 136 may be a density detector, a viscosity detector, a pH detector, an electrical conductivity or resistivity detector, a turbidity detector, and/or a molecular detector such as a gas chromatograph. Maximum values of density, viscosity, turbidity, and molecular weight may be specified, a range of electrical conductivity and/or resistivity may be specified, and/or minimum values of pH may be specified, to support controlling an amount of fresh absorbent provided to the system, or to support controlling an amount of spent absorbent removed from the system.

A controller 138 is operatively coupled to the detector 136 to receive a signal from the detector 136 that represents the chemical condition of the absorbent in the absorbent recycle line 122. A spent absorbent control valve 140 is provided in the spent absorbent line 144 and operatively coupled to the controller 138. A flow rate of spent absorbent removed from the system is controlled by a signal sent from the controller 138 to the spent absorbent control valve 140. The controller 138 is also operatively coupled to the fresh absorbent control valves 142 and 152, and flow rates of fresh absorbent through the first fresh absorbent inlet 121 and the second fresh absorbent inlet 120 are controlled by signals sent from the controller 138 to the fresh absorbent control valves 142 and 152.

Adding the fresh absorbent upstream of the recycle absorbent line provides fresh absorbent to dilute and/or remediate the chemical condition of the used absorbent flowing to the absorbent recycle line to address, at least partially, the possibility of forming solids in the absorbent recycle line. In some cases, addition of fresh absorbent to the separation section may also enhance decoupling of the absorbent aerosol the clean gas exiting the linear contactor 110. The resulting liquid may settle to the bottom of the separation section 126, and is in any case recovered in the separation section 126.

Recycled absorbent is obtained from the recovered absorbent of the separation section 126 and exits through the recycle absorbent line 122 to encounter the detector 136. If the detector 136 signals the controller 138 that the chemical condition of the absorbent is out of tolerance (i.e. pH is too low, electrical conductivity or resistivity out of range, or density, viscosity, turbidity, or molecular weight too high, indicating potential difficulty handling the absorbent or reduced efficacy of the absorbent), the controller 138 can signal either the spent absorbent control valve 140, or the fresh absorbent control valve 142, to open. If the controller 138 signals the spent absorbent control valve 140, the fresh absorbent control valve 142 may be slaved to the spent absorbent control valve 140, or vice versa, to maintain material balance. Alternately, a level indicator can be provided in the separation section 126 for independent control of the two control valves 140 and 142. If the detector 136 signals the controller 138 that the chemical condition of the absorbent is adequate (i.e. pH is not too low and/or electrical conductivity and/or resistivity is in range, and/or density, viscosity, turbidity, or molecular weight is not too high), the controller 138 can close one or both valves 140 and 142.

A separation absorbent recycle line 131 may be coupled to the recycle absorbent line 122 and to the fresh absorbent line 146. As shown here, the separation absorbent recycle line 131 is coupled to the recycle absorbent line 122 between the separation section 126 and the detector 136. Alternately, the separation absorbent recycle line 131 may be coupled to the spent absorbent line 144 between the spent absorbent control valve 140 and the separation section 126. In a further alternate, the separation absorbent recycle line 131 may be coupled to the recycle absorbent line 122 between the spent absorbent line 144 and the mixing section 124. Shown here, the separation absorbent recycle line 131 is coupled to the fresh absorbent line 146 between the fresh absorbent control valve 142 and the separation section 126. Alternately, the separation absorbent recycle line 131 may be coupled directly to the separation section 126, rather than the fresh absorbent line 146. A check valve 141 may be provided in the fresh absorbent line 146, with the separation absorbent recycle line 131 intersecting the fresh absorbent line 146 between the separation section 126 and the fresh absorbent control valve 142, to prevent recycle absorbent from flowing toward the fresh absorbent source through the fresh absorbent line 146. A separation recycle absorbent control valve 133 may be used to control flow of separation recycle absorbent to the fresh absorbent line 146. The controller 138 may be coupled to the separation recycle absorbent control valve 133 to maintain a flow of liquid to the separation section 126.

The controller 138 may also operate the control valves 140 and 142 to target a total overall flow rate of absorbent through the recycle absorbent line 122 based on flow rate of gas charged to the linear contactor 110. For example, if the rate of gas flow to the linear contactor 110 increases, the controller 138 may open the fresh absorbent control valve 140 to perform a commensurate increase in the rate of absorbent flowing in the recycle absorbent line 122, and vice versa. Alternately, in response to a gas rate increase, the controller 138 can incrementally close the spent absorbent control valve 140 to increase the rate of absorbent in the recycle absorbent line 122. A sophisticated control program may be utilized in the controller 138 to determine the relative importance of various objectives for manipulating the control valves 140 and 142.

An optional first gas composition sensor 150 can be coupled to the dry gas line 108 to sense the composition of the dry gas. An optional second gas composition sensor 154 can be coupled to the clean dry gas stream 132 to sense the composition of the clean dry gas. An amount of contaminants, such as sulfur compounds, in each stream can be measured by the gas composition sensors 150 and 154. From the flowrate of each stream and the amount of contaminants in each stream, an amount of contaminants removed from the gas can be computed. If the contaminants are known, and the absorbent is known, reduction of absorption capacity, for example consumption of reactive sites, in the absorbent can be computed.

The sensors 150 and 154 are operatively coupled to the controller 138 so that the controller can receive signals representing the amount of contaminants in each of the gas flowing through the dry gas line 108 and the clean dry gas stream 132. From the amount of contaminants consumed, a theoretical minimum amount of absorbent needed to remove that amount of contaminants can be computed (e.g. a mole of fresh triazine theoretically removes sulfur from two moles of dry gas before becoming spent). The controller can compare the theoretical minimum amount of absorbent needed to the flow rate of fresh absorbent at the fresh absorbent control valves 142 and 152. A control scheme can be structured that slowly moves the fresh absorbent flow rate toward the theoretical minimum so long as chemical condition of the recycle absorbent detected by the chemical condition sensor 136 remains nominal. As noted above, if the chemical condition of the recycle absorbent becomes unacceptable, the flow rate of fresh absorbent can be increased.

The controller 138 can be configured to operate various control loops to control the fresh absorbent flow rate at the fresh absorbent control valves 142 and 152. In a first control loop, the controller 138 can be configured to set the flow rate of fresh absorbent to the first fresh absorbent inlet 121 based on the theoretical minimum amount of absorbent needed to remove the contaminants detected by the first gas composition sensor 150. The controller 138 uses the contaminant concentration detected by the first sensor 150, along with the flow rate of feed gas in the dry gas line 108 to determine a molar rate of contaminant flow. Based on stoichiometry of the contaminant removal process, the controller 138 determines a molar rate of absorbent needed to remove the contaminants. The controller 138 then sets the flow rate target of the first fresh absorbent control valve 152 at the determined molar rate of absorbent. The controller 138 can also be configured to increase the flow rate target of the second fresh absorbent control valve 142 when the chemical condition of the recycle absorbent, as reflected by the signal sent by the chemical condition sensor 136 to the controller 138, is out of tolerance. The controller 138 can also reduce the flow rate target of the second fresh absorbent control valve 142 when the chemical condition is within tolerance.

In a second control loop, the controller 138 can be configured to split the theoretical minimum amount of absorbent between the two fresh absorbent inlets 121 and 120 according to a set ratio, which can be constant or can depend on the determined chemical condition. For example, 80% of the theoretical minimum absorbent rate can be assigned to the first fresh absorbent control valve 152 and 20% of the theoretical minimum absorbent rate can be assigned to the second fresh absorbent control valve 142. As above, an additional amount of fresh absorbent can be assigned to one or both of the fresh absorbent control valves 142 and 152 based on the chemical condition. In another example, the ratio of the theoretical minimum amount of absorbent can be set based on the determined chemical condition. The ratio can be reduced if the chemical condition is out of tolerance to send more fresh absorbent to the second fresh absorbent inlet 120. The additional amount of fresh absorbent assigned to the second fresh absorbent inlet 120 can also be increased if the chemical condition is out of tolerance. If the chemical condition is within tolerance, the additional amount of fresh absorbent assigned to the second fresh absorbent inlet 120 is reduced, and the ratio of the theoretical minimum amount assigned to the first fresh absorbent inlet is increased. This control scheme has the effect of reducing flow rate of fresh absorbent at the first fresh absorbent inlet 121 by a programmed amount if the chemical condition of the recycle absorbent is out of tolerance to avoid overuse of fresh absorbent.

Figure 2:
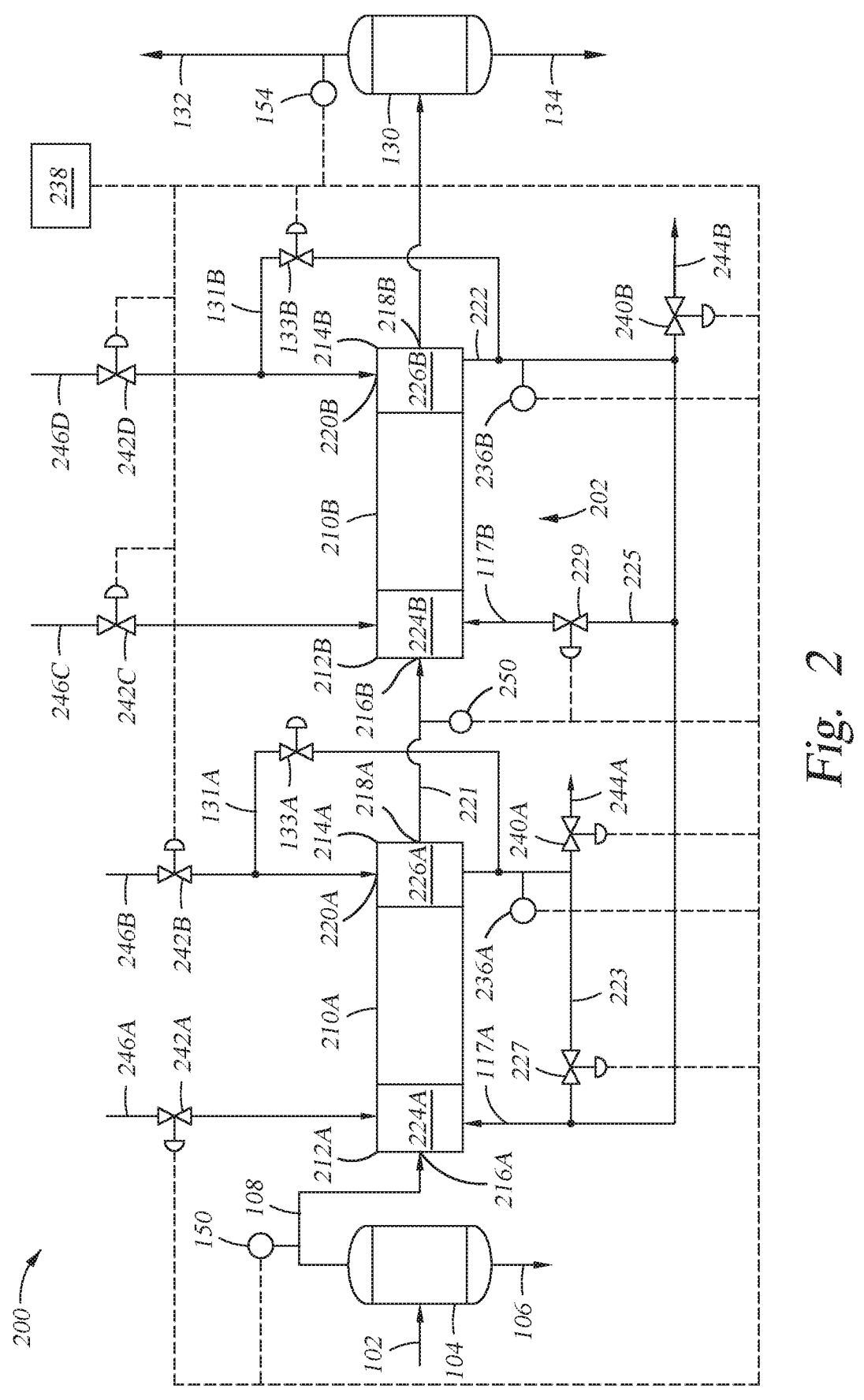

FIG. 2 is a process diagram of an absorption apparatus 200 according to another embodiment. The apparatus 200 is similar to the apparatus 100 in many respects, chiefly in that both are linear-type apparatuses where gas to be treated flows, along with absorbent, linearly along a contacting structure. In the apparatus 100, the contacting structure is the linear contactor 110. Here, the contacting structure is a dual-contactor apparatus 202. The dual-contactor apparatus 202 includes a first linear contactor 210A and a second linear contactor 210B, each of which is substantially the same as the linear contactor 110 of FIG. 1.

The first and second linear contactors 210A and 210B are connected in series, with intermediate gas from the first separation section 226A flowing directly to the second mixing section 224B. Each linear contactor 210A and 210B has a first end 212, a second end 214, a mixing section 224 at the first end, and a separation section 226 at the second end. The first end 212A of the first linear contactor 210A is coupled to, and receives, the dry gas stream 108 as a feed gas into a first mixing section 224A. A first separation section 226A of the second end 214A of the first linear contactor 210A is fluidly coupled to a second mixing section 224B of the first end 212B of the second linear contactor 210б by a transfer 221. The transfer 221 carries intermediate gas from the first separation section 224A to the second mixing section 226B. Intermediate gas and aerosol absorbent liquid flows along the second linear contactor 210B to a second separation section 226B at the second end 214B of the second linear contactor 210б.

In the separation section of each of the linear contactors, the aerosol absorbent liquid is separated from the gas to yield a recovered absorbent, from which recycled absorbent is obtained. Thus, in the first separation section 226A, aerosol absorbent liquid is separated from gas to yield the intermediate gas and a first recovered absorbent. In the second separation section 226B, aerosol absorbent liquid is separated from gas to yield a clean gas and a second recovered absorbent.

A full recycle absorbent line 222 is coupled to the second linear contactor 210B at the second end 214B thereof. The full recycle absorbent line 222 is also coupled to the first end 212A of the first linear contactor 210A. The full recycle absorbent line 222 is coupled to the second separation section 226B and to the first mixing section 224A. As with the apparatus 100, the mixing section of each linear contactor 210A and 210B has an aerosol generator for dispersing liquid into the flowing gas stream. In the case of the second mixing section 224B, the aerosol generator disperses liquid absorbent into the intermediate gas from the transfer 221, which may have some residual aerosol from the first linear contactor 210A.

The full recycle absorbent line 222 carries recycle absorbent substantially the full length of the apparatus 200 from the second separation section 226B of the second linear contactor 210B to the first mixing section 224A of the first linear contactor 210A. As noted above, the second recovered absorbent contains partially spent absorbent from the second linear contactor 210B. Each of the first and second linear contactors 210A and 210B has respective first and second fresh absorbent lines. The first linear contactor 210A has a first fresh absorbent line 246A coupled to the mixing zone 224A thereof and a second fresh absorbent line 246B coupled to the separation zone 226A thereof. The second linear contactor 210B has a third fresh absorbent line 246C coupled to the mixing zone 224B thereof and a fourth fresh absorbent line 246D coupled to the separation zone 226B thereof. Injection rate of fresh absorbent through the fresh absorbent lines 246A-D is controlled by respective fresh absorbent control valves 242A-D disposed in the respective fresh absorbent lines 246A-D. Thus, a first fresh absorbent control valve 242A controls the flow rate of a first fresh absorbent flowing through the first fresh absorbent line 246A, a second fresh absorbent control valve 242B controls the flow rate of a second fresh absorbent flowing through the second fresh absorbent line 246B, a third fresh absorbent control valve 242C controls the flow rate of a third fresh absorbent flowing through the third fresh absorbent line 246C, and a fourth fresh absorbent control valve 242D controls the flow rate of a fourth fresh absorbent flowing through the fourth fresh absorbent line 246d.

A partial recycle absorbent line 223 is coupled to the first separation section 226A of the first linear contactor 210A. The partial recycle absorbent line 223 carries a first recycled absorbent part of the length of the apparatus 200 from the second end 214A to the first end 212A of the first linear contactor 210A. The first recycled absorbent is obtained from the first recovered absorbent of the first separation section 226A. The partial recycle absorbent line 223 can be coupled to the full recycle absorbent line 222, as shown in FIG. 2, so both recycle absorbent streams flow into the first mixing section 214A together. Alternately, the partial recycle absorbent line 223 may be coupled directly to the first mixing section 214A. A flow rate of the first recycled absorbent in the first linear contactor 210A through the partial recycle absorbent line 223 is controlled by control valve 227.

A second recycled absorbent can also be returned to the second mixing section 224B by an intermediate recycle absorbent return line 225 coupled between the second mixing section 224B and the full recycle absorbent line 222. A third recycled absorbent is mixed with the first recycled absorbent in the partial recycle absorbent line 223. The second and third recycled absorbent are obtained from the second recovered absorbent. An intermediate recycle absorbent control valve 229 is disposed in the intermediate recycle absorbent return line 225 to control a flow rate of the second recycled absorbent return to the second mixing section 224. The recycle absorbent control valves 227 and 229 can be used to control the overall utilization of recycled absorbent withdrawn from the first separation section 226A and the second separation section 226B, respectively. The control valves 227 and 229 are coupled to the controller 238 to provide overall supervision of the relative utilization of recycle from the second linear contactor 210B to the first and second linear contactors 210A and B, and from the first linear contactor 210A back to the first linear contactor 210A. The fresh absorbent control valves 242B and D are also coupled to the controller 238 to provide supervision of fresh absorbent to the separation sections 226A and B. Respective separation recycle absorbent lines 131A and B may be provided for the first and second linear contactors 210A and B, as above with the linear contactor 110, with similar controls.

Each recycle absorbent line 222 and 223 has a spent absorbent line coupled thereto. A first spent absorbent line 244A removes a first spent absorbent from the first recycled absorbent in the partial recycle absorbent line 223. Here, the first spent absorbent line 244A is coupled to the partial recycle absorbent line 223 between the partial recycle absorbent control valve 227 and the first separation section 226A. Alternately, the first spent absorbent line 244A can be coupled to the partial recycle absorbent line 223 between the partial recycle absorbent control valve 227 and the first mixing section 224A. A flow rate of the first spent absorbent is controlled by a first spent absorbent control valve 240A disposed in the first spent absorbent line 244A. A second spent absorbent line 244B removes a second spent absorbent from the full recycle absorbent line 222 through second spent absorbent control valve 240B. As noted above, there may be only one spent absorbent line in some embodiments, which will be coupled to the full absorbent recycle line 222.

Each of the recycle absorbent lines 222 and 223 has a detector 236 coupled thereto. A first detector 236A is coupled to the partial recycle absorbent line 223, and a second detector 236B is coupled to the full recycle absorbent line 222. As with the detector 136 above, the detectors 236 detect the condition of the recycle absorbent in each absorbent recycle line, and may be any of the kinds of sensors described above in connection with the detector 136. As above, the detectors 236 and the control valves 240 are coupled to a controller 238. If either detector 236A or B detects that the chemical condition of the recycle absorbent flowing in respective recycle lines 223 and 222, the controller 238 can signal the respective control valve 240A or B to open, removing spent absorbent at an increasing rate to rectify the chemical condition of the recycle absorbent in the respective line.

The apparatus 200 provides flexibility to utilize absorbent in the most effective way to absorb contaminants from the dry gas 108 to make the clean gas 132 using as little absorbent as possible. Recycle and spent absorbent flow rates can be adjusted based on the readings from the detectors 236. Fresh absorbent flow rates can be adjusted based on absorbent material balance given the spent absorbent flow rates and the gas flow rate into the apparatus. Fresh absorbent flow rates can also be set by determining a theoretical minimum amount of absorbent needed to remove the contaminants based on the properties, such as stoichiometry or solubility, of the contaminant removal process. Overall utilization of absorbent can be adjusted by changing tolerances for the detectors 236 and/or by adjusting the response to detected chemical condition. For example, reducing tolerance of one or both detectors for diminished chemical condition of recycle absorbent can be made to increase rejection of spent absorbent, which will increase demand for fresh absorbent, and vice versa.

As in the apparatus 100 of FIG. 1, gas composition sensors can be used to monitor removal of contaminants from the gas in the apparatus 200. The gas sensors 150 and 154 can be included, as in FIG. 1, and operatively coupled to the controller 238. A third gas sensor 250 can be coupled to the transfer 221 to monitor quantity of contaminants in the intermediate gas flowing through the transfer 221, and operatively coupled to the controller 238. Such a configuration enables monitoring of contaminant removal in each linear contactor 210A and 210B. Using the readings from the sensors 150, 154, and 250, the controller 238 can determine the theoretical minimum flow rate of fresh absorbent needed in each linear contactor 210A and 210B, and overall for the apparatus 200. The controller 238 can be configured to reduce the flow rate of fresh absorbent at the first fresh absorbent control valve 242A toward the theoretical minimum fresh absorbent flow rate of the first linear contactor 210A as long as the chemical condition of the recycle absorbent in the partial absorbent recycle line 223, as defined by the signal sent from the chemical condition sensor 236A to the controller 238, is within tolerance. The controller 238 can also be configured to reduce the flow rate of fresh absorbent at the third fresh absorbent control valve 242C toward the theoretical minimum fresh absorbent flow rate of the second linear contactor 210B as long as the chemical condition of the recycle absorbent in the full recycle absorbent line 222, as defined by the signal sent from the chemical condition sensor 236B to the controller 238, is within tolerance. Finally, the controller 238 can be configured to adjust the total amount of fresh absorbent toward the overall theoretical minimum for the entire apparatus 200 using any convenient scheme.

For example, if the total fresh absorbent flow rate is above the total theoretical minimum, the controller can reduce the target rate for the third fresh absorbent control valve 242C first until no further adjustment is possible (i.e. flow rate through the control valve 242C reaches zero). Then, for example, the controller 238 can lower the target rate of the second or fourth fresh absorbent control valves 242B and D, whichever is greater, to reduce overall fresh absorbent flow, so long as the chemical condition of the corresponding recycle absorbent stream is within tolerance (i.e. target rate for control valve 242D can be reduced if it is greater than target rate for control valve 242B and chemical condition at sensor 236B is nominal, or target rate for control valve 242B can be reduced if it is greater than target rate for control valve 242D and chemical condition at sensor 236A is nominal).

Similar to the controller 138, the controller 238 can have many control schemes to control fresh absorbent usage in the apparatus 200. In one control scheme, flow rate of the first and third fresh absorbent can be set based on the theoretical minimum amount of absorbent needed in the respective linear contactors 210A and B. The controller 238 receives signals from the first, second, and third gas composition sensors 150, 154, and 250, and from the first and second chemical condition sensors 236A and 236B. Based on the signals from the first and second gas sensors 150 and 154 indicating amounts of contaminants in the dry gas and clean gas, and the flow rates of dry gas and clean gas, the controller can determine a theoretical minimum amount of absorbent needed to remove all the contaminants in the dry gas, or to reduce the contaminant level in the dry gas to that of the clean gas based on characteristics, such as stoichiometry, solubility, or selectivity, of the contaminant removal process. Based on the signals from the third gas sensor 250, the controller can similarly determine a theoretical minimum amount of absorbent needed to reduce the contaminant level of the dry gas to that of the intermediate gas. The controller 238 can then set the flow rate of the first fresh absorbent based on the theoretical minimum amount of absorbent needed to remove all contaminants from the dry gas, to reduce the contaminant level in the dry gas to that of the clean gas, or to reduce the contaminant level in the dry gas to that of the intermediate gas. If the flow rate of the first fresh absorbent is set to reduce the contaminant level in the dry gas to that of the intermediate gas, the flow rate of the third fresh absorbent can be set based on the difference between the theoretical minimum amount of absorbent needed to reduce the contaminant level in the dry gas to that of the clean gas and the flow rate of the second fresh absorbent, such that the total of the second and third fresh absorbent is based on the dry gas to clean gas removal.

The controller 238 can also set the flow rates of fresh absorbent based on the chemical condition signals received from the chemical condition sensors. Based on the chemical condition determined by, or from, the first chemical condition sensor 236A, the controller 238 can set the flow rate of the second fresh absorbent by manipulating the second fresh absorbent control valve 242B. Based on the chemical condition determined by, or from, the second chemical condition sensor 236B, the controller 238 can set the flow rate of the fourth fresh absorbent by manipulating the fourth fresh absorbent control valve 242D. In this way, if the chemical condition of either deteriorates, fresh absorbent can be added to improve the chemical condition, and vice versa.

FIG. 3 is a flow diagram illustrating a method 300 according to one embodiment. The method 300 may be practiced using any of the apparatuses described herein, including the embodiments of FIGS. 1 and 2. The method 300 is a method or removing contaminants, for example acidic sulfur compounds such as $H_2S$, from a gas stream. At 302, a gas stream containing contaminants is provided to a mixing section of a linear contactor. The linear contactor can be a tubular member, such as the linear contactors 110 and 210 described above. At 304, a recycle absorbent stream comprising an absorbent selected to remove the specific contaminants is provided to the mixing section of the linear contactor. The recycle absorbent stream is sourced from the exit end of the linear contactor and recycled to the mixing section for further use in removing contaminants. The absorbent is partially consumed, or otherwise degraded, while removing contaminants. In the case of sulfur removal, use of the absorbent lowers its pH, which in turn enhances the sulfur removal reaction up to the point at which dithiazine concentration becomes dominant.

At 306, an aerosol is formed of the recycle absorbent in the gas stream. An aerosol generator is used to form liquid droplets small enough to be suspended and carried in the gas stream. Forming an aerosol of the liquid provides intimate contact between the gas containing contaminants and the absorbent along a large surface area to facilitate expeditious contaminant removal.

At 308, the aerosol is flowed through the linear contactor from the mixing section to a separation section thereof. While flowing, contact between the aerosol droplets and the gas facilitates removal of contaminants into the absorbent. In the case of acidic sulfur compounds, the sulfur compounds diffuse into the gas and then are removed by chemical reaction with the absorbent. In the case of a triazine absorbent, sulfur replaces nitrogen at one, two, or all three locations in the triazine ring to form thiazines and trithianes. Sulfur also replaces nitrogen in thiazines. As nitrogen is replaced, amines are liberated into the absorbent, lowering the pH. The chemical mechanism of nitrogen replacement by sulfur in the triazine (and thiazine) ring, depending on a first step of nitrogen protonation in the liquid phase, is enhanced by lower pH. The mechanism is kinetically slowed by reduction of both consumable nitrogen sites and consumable sulfur in the gas, but at a given concentration of sulfur compounds, the pH effect dominates since consumable nitrogen sites are relatively excess even in partially used triazine absorbent. Thus, as the triazine absorbent is exposed to the acidic sulfur compounds, the overall efficacy of the absorption reaction increases to a point. For this reason, using recycle absorbent enhances effectiveness of sulfur removal.

As the triazine absorbent consumes sulfur, the thiazines and trithianes can become polymerizable, particularly in low-pH environments. If polymers and oligomers form in the absorbent, viscosity and/or density can increase and the absorbent may become difficult to flow. In general, as contaminants are removed from the gas into the absorbent, the removal capacity of the absorbent degrades. For these reasons, at 310, a fresh absorbent is added to the separation section of the linear contactor. In the triazine case, the fresh absorbent can lower the propensity of used absorbent to polymerize by diluting the polymerizable components. The fresh absorbent may be added to the separation section in a way that facilitates conglomeration of liquid droplets from the aerosol into a bulk liquid phase as recovered absorbent. This recovered absorbent becomes the source of the recycle absorbent referred to at 304. The fresh absorbent can lower viscosity and density of the recovered absorbent, improving pumpability, and can raise pH in the triazine case. The fresh absorbent thus becomes part of the recycle absorbent.

At 312, a clean gas stream and the absorbent are both recovered in the separation section, and the recycle absorbent is obtained from the recovered absorbent. As noted above, providing the fresh absorbent to the separation section can assist in separating aerosol droplets from the gas as a bulk liquid that can be recovered. Additionally, recycle absorbent can also be provided to the separation section. The clean gas stream and the recycle absorbent stream are separately transported out of the separation section and out of the linear contactor. The clean gas stream may be subjected to further separation of residual liquid aerosol droplets in a separate vessel, and any liquid recovered recycled back to the process, for example to the recycle absorbent, or discarded.

At 314, a chemical condition of the recycle absorbent stream is detected. As noted above, use of the absorbent changes its chemical condition, and under certain circumstances recycle absorbent may polymerize. As molecular weight grows in the recycle absorbent, viscosity and density may increase. As molecules reach the limit of solubility, which declines with pH, some particles may form in the recycle absorbent. Thus, turbidity of the recycle absorbent may also increase. A detector may be used to detect viscosity, density, pH, molecular weight, chemical composition, and/or turbidity to determine chemical condition of the recycle absorbent. An upper threshold can be defined for one or all the above conditions, and that upper threshold can be used to determine that the chemical condition of the recycle absorbent is out of tolerance. An upper threshold on an average molecular weight can be defined, for example number average or weight average molecular weight, to determine chemical condition of the recycle absorbent A lower threshold on pH in the triazine absorbent can indicate when substitutable nitrogen sites have fallen to a low concentration such that the recycle absorbent is regarded as spent.

The parameters above can be used in removing spent absorbent from the recycle absorbent stream, at 316. Removing a spent absorbent stream from the recycle absorbent stream at 316 removes spent and mostly spent absorbent molecules, along with any higher molecular weight species, from the recycle absorbent. The material can be replaced with fresh absorbent as described above. The rate at which spent absorbent is removed can be adjusted based on the chemical condition detected at 314 using, for example, a controller to target a certain reading from the detector or maintain readings above or below a threshold. Alternately, the rate at which spent absorbent is removed can be based on the rate at which fresh absorbent is added to maintain material balance. In this way, the chemical condition of the recycle absorbent can be controlled, and the sulfur removal process can be consistent.

While the foregoing is directed to embodiments of the present invention, other and further embodiments of the present disclosure may be devised without departing from the basic scope thereof, and the scope thereof is determined by the claims that follow.

What is claimed is:

1. A method, comprising:
providing a feed gas stream containing contaminants to a first end of a linear contactor having a second end opposite the first end;
providing an absorbent aerosol to the first end of the linear contactor;
flowing the feed gas stream and the absorbent aerosol to the second end of the linear contactor;
separating the absorbent aerosol from the feed gas stream to form a recovered absorbent;
recycling a portion of the recovered absorbent to the first end of the linear contactor as recycled absorbent;
mixing the recycled absorbent with a first fresh absorbent to form the absorbent aerosol;
providing a second fresh absorbent at the second end of the linear contactor;
recovering a clean gas stream at the second end of the linear contactor;
determining a contaminant composition of the feed gas stream and the clean gas stream;

determining a theoretical minimum amount of absorbent needed to remove the contaminants from the feed gas stream based on stoichiometry of the absorption reaction;

determining a chemical condition of the recycled absorbent;

setting a flow rate of the first fresh absorbent based on the determined theoretical minimum amount of absorbent; and setting a flow rate of the second fresh absorbent based on the determined chemical condition.

2. The method of claim 1, further comprising lowering the flow rate of the second fresh absorbent if the chemical condition is within a tolerance.

3. The method of claim 1, wherein the mixing the recycled absorbent with the first fresh absorbent is performed using a mixing section of the linear contactor, the mixing section comprising an aerosol generator.

4. The method of claim 3, wherein separating the absorbent aerosol from the gas stream is performed in a separation section of the linear contactor, and the recycled absorbent is obtained from the separation section.

5. The method of claim 4, further comprising separating residual absorbent from the clean gas to form a clean dry gas and a residual absorbent.

6. The method of claim 5, further comprising removing a spent absorbent stream from the recycled absorbent stream.

7. The method of claim 6, wherein a flow rate of the spent absorbent stream is set based on the sum of all fresh absorbent streams.

8. The method of claim 7, further comprising recovering the residual absorbent stream into the recycled absorbent stream.

9. A method, comprising:
providing a feed gas stream containing contaminants to a first end of a first linear contactor having a second end thereof opposite the first end thereof;
providing a first absorbent aerosol to the first end of the first linear contactor;
flowing the feed gas stream and the first absorbent aerosol to the second end of the first linear contactor;
separating the first absorbent aerosol from the feed gas stream to form a first recovered absorbent;
recycling a portion of the first recovered absorbent to the first end of the first linear contactor as a first recycled absorbent;
mixing the first recycled absorbent with a first fresh absorbent to form the first absorbent aerosol;
providing a second fresh absorbent at the second end of the first linear contactor;
recovering an intermediate gas stream at the second end of the first linear contactor;
providing the intermediate gas stream to the first end of a second linear contactor having a second end thereof opposite the first end thereof;
providing a second absorbent aerosol to the first end of the second linear contactor;
flowing the intermediate gas stream and the second absorbent aerosol to the second end of the second linear contactor;
separating the second absorbent aerosol from the intermediate gas stream to form a second recovered absorbent;
recycling a portion of the second recovered absorbent to the first end of the second linear contactor as a second recycled absorbent;

mixing the second recycled absorbent with a third fresh absorbent to form the second absorbent aerosol;
providing a fourth fresh absorbent at the second end of the second linear contactor;
recovering a clean gas stream at the second end of the second linear contactor;
determining a contaminant composition of the feed gas stream and the clean gas stream;
determining a theoretical minimum amount of absorbent needed to remove the contaminants from the feed gas stream based on stoichiometry of the absorption reaction;
determining a chemical condition of the first and second recycled absorbents;
setting a flow rate of the first fresh absorbent, the third fresh absorbent, or both based on the determined theoretical minimum amount of absorbent;
setting a flow rate of the second fresh absorbent based on the determined chemical condition of the first recycled absorbent; and
setting a flow rate of the fourth fresh absorbent based on the determined chemical condition of the second recycle absorbent.

10. The method of claim 9, further comprising removing a portion of the second recycled absorbent as a third recycled absorbent and mixing the third recycled absorbent with the first recycled absorbent.

11. The method of claim 10, further comprising removing a portion of the first recycled absorbent as a first spent absorbent and removing a portion of the second recycled absorbent as a second spent absorbent.

12. The method of claim 11, further comprising determining a contaminant composition of the intermediate gas stream, determining an intermediate theoretical minimum amount of absorbent needed to reduce the contaminants in the feed gas stream to the level in the intermediate gas stream, and setting the flow rate of the first fresh absorbent based on the determined intermediate theoretical minimum amount.

13. The method of claim 12, further comprising setting a flow rate of the third recycled absorbent based on the chemical condition of the second recycled absorbent.

14. The method of claim 13, further comprising setting a flow rate of the first spent absorbent based on the flow rates of the first fresh absorbent, the second fresh absorbent, and the third recycle absorbent.

15. The method of claim 14, further comprising setting the flow rate of the second spent absorbent based on the third fresh absorbent, the fourth fresh absorbent, and the third recycled absorbent.

16. The method of claim 15, wherein the mixing the first recycled absorbent with a first fresh absorbent to form the first absorbent aerosol is performed in a first mixing section of the first linear contactor, and wherein the mixing the second recycled absorbent with a third fresh absorbent to form the second absorbent aerosol is performed in a second mixing section of the second linear contactor.

17. The method of claim 16, wherein the separating the first absorbent aerosol from the feed gas stream to form a first recovered absorbent is performed at a first separation section of the first linear contactor, the separating the second absorbent aerosol from the intermediate gas stream to form a second recovered absorbent is performed at a second separation section of the second linear contactor, the first recycled absorbent is obtained from the first separation section, and the second recycled absorbent is obtained from the second separation section.

\* \* \* \* \*